United States Patent
Ikeo (10) Patent No.: US 11,985,036 B2
(45) Date of Patent: May 14, 2024

(54) NETWORK MANAGEMENT DEVICE, MANAGEMENT METHOD, AND RECORDING MEDIUM

(71) Applicant: OMRON Corporation, Kyoto (JP)

(72) Inventor: Yuji Ikeo, Kusatsu (JP)

(73) Assignee: OMRON Corporation, Kyoto (JP)

( * ) Notice: Subject to any disclaimer, the term of this patent is extended or adjusted under 35 U.S.C. 154(b) by 291 days.

(21) Appl. No.: 17/439,801

(22) PCT Filed: Feb. 27, 2020

(86) PCT No.: PCT/JP2020/007896
§ 371 (c)(1),
(2) Date: Sep. 15, 2021

(87) PCT Pub. No.: WO2020/195502
PCT Pub. Date: Oct. 1, 2020

(65) Prior Publication Data
US 2022/0173974 A1    Jun. 2, 2022

(30) Foreign Application Priority Data

Mar. 27, 2019 (JP) .................................. 2019-059807

(51) Int. Cl.
*H04L 41/12* (2022.01)
*H04L 12/42* (2006.01)

(52) U.S. Cl.
CPC .............. *H04L 41/12* (2013.01); *H04L 12/42* (2013.01)

(58) Field of Classification Search
CPC ................................. H04L 12/42; H04L 41/12
See application file for complete search history.

(56) References Cited

U.S. PATENT DOCUMENTS

2005/0144271 A1*  6/2005  Shirane ............... H04L 41/0883
                                                                        714/4.1
2015/0085641 A1*  3/2015  Cecil .................. H04L 41/0663
                                                                        370/223

FOREIGN PATENT DOCUMENTS

| CN | 1610323 | 4/2005 |
| CN | 103403720 | 11/2013 |
| EP | 2672662 | 12/2013 |
| EP | 2688002 | 1/2014 |
| EP | 3561623 | 10/2019 |
| JP | 2002101125 | 4/2002 |

(Continued)

OTHER PUBLICATIONS

"Office Action of China Counterpart Application" with English translation thereof, dated Jun. 1, 2022, p. 1-p. 14.

(Continued)

*Primary Examiner* — James P Duffy
(74) *Attorney, Agent, or Firm* — JCIPRNET (57) ABSTRACT

The present invention provides a management device that assists in setting a ring topology in a design network configuration. This management device 3 manages a network that includes a master device 1 and a plurality of slave devices 2 connected to the master device 1, the management device 3 including a ring topology assessment unit 332 for assessing, on the basis of design network configuration information D1 created by a user and slave information D2 that represents the unique information per type of each slave device 2, whether a ring topology configured from a plurality of slave devices 2 can be generated.

10 Claims, 10 Drawing Sheets

(56) References Cited

FOREIGN PATENT DOCUMENTS

| JP | 2006302297 | 11/2006 |
| JP | 2010272034 | 12/2010 |
| JP | 2012194631 | 10/2012 |

OTHER PUBLICATIONS

"Search Report of Europe Counterpart Application", dated Nov. 17, 2022, pp. 1-11.
"International Search Report (Form PCT/ISA/210) of PCT/JP2020/007896," dated on May 26, 2020, with English translation thereof, pp. 1-4.
"Written Opinion of the International Searching Authority (Form PCT/ISA/237) of PCT/JP2020/007896," dated May 26, 2020, with English translation thereof, pp. 1-6.

* cited by examiner

NETWORK MANAGEMENT DEVICE, MANAGEMENT METHOD, AND RECORDING MEDIUM

CROSS-REFERENCE TO RELATED APPLICATION

This application is a 371 application of the International PCT application serial no. PCT/JP2020/007896, filed on Feb. 27, 2020, which claims the priority benefits of Japan Patent Application No. 2019-059807, filed on Mar. 27, 2019. The entirety of each of the above-mentioned patent applications is hereby incorporated by reference herein and made a part of this specification.

BACKGROUND OF THE INVENTION

Field of the Invention

The invention relates to a management device, a management method, and a management program which manage a network including nodes such as a master device and slave devices, etc.

Description of Related Art

In factory automation (FA), manufacturing equipment provided in a factory is controlled by an industrial network system configured from nodes such as various slave devices controlling and collecting data of the manufacturing equipment, a master device collectively managing the slave devices, etc.

Most issues in the manufacturing equipment of the factory, such as a production line, relate to network communication. When an issue relating to network communication arises, issues relating to the applications of motion control and safety control, etc., operated at the same time in the system occur together.

As a means for solving the communication issue of such network, a ring topology connecting the slave devices is set to ensure network redundancy. However, in order to configure the ring topology, it is necessary to wire communication cables to be ring-like, and required wiring locations are increased. As a result, the issue that the wiring becomes complicated and difficult to understand may arise.

Examples of the technologies for assisting in the network design of various connection configurations including a ring topology include the technology disclosed in Patent Document 1, for example. In Patent Document 1, a technology for designing a system configuration of a control system configured from machines such as a programmable logic controller (PLC), etc. is disclosed.

PRIOR ART DOCUMENT

Patent Document

[Patent Document 1] Japanese Laid-open No. 2010-272034

SUMMARY OF THE INVENTION

Problems to be Solved by the Invention

In the technology for assisting in the design of a network configuration, by properly connecting wires on the editor for carrying out the design, a connection mode among the slave devices can be expressed in a ring topology in the designed network configuration. However, in order to correctly configure the ring topology on the editor, like in the actual device, it is necessary to connect the wiring of the communication cable, which is complicated and difficult to understand, in the correct ring shape on the editor. At the time of configuring the ring topology on the editor at the design stage and wiring the actual slave devices, there is also a case where an erroneous wire connection on the editor at the design stage is not noticed, and the redundant wiring for the actual slave devices cannot be set correctly.

An objective of the invention is to provide a management device assisting in setting of a ring topology in a designed network configuration.

Means for Solving Problems

A management device according to the invention manages a network including a master device and multiple slave devices connected to the master device. The management device includes: a ring topology assessment unit, assessing whether a ring topology configured from the slave devices is able to be generated based on designed network configuration information created by a user and slave information representing unique information per type of each of the slave devices.

In addition, in the management device, the slave information may include port information of each of the slave devices, and each of the port information may include information of a ring start port and a ring end port supporting the ring topology. The ring topology assessment unit may assess whether the ring topology is able to be generated based on the information of the ring start port and the ring end port included in the port information.

In addition, in the management device, the ring topology assessment unit may prompt the user with the information of the ring start port and the ring end port with which the ring topology is to be generated.

In addition, in the management device, the ring topology assessment unit may identifiably express a position of the ring topology in a network configuration diagram expressed based on the configuration information.

In addition, in the management device, the ring topology assessment unit may assess, based on the slave information, whether the ring topology is supported for each of the slave devices from which the ring topology is configured.

In addition, in the management device, the ring topology assessment unit may identifiably express the slave device not supporting the ring topology in a network configuration diagram expressed based on the configuration information.

A management method according to the invention manages a network including a master device and multiple slave devices connected to the master device. The management method includes: a ring topology assessment step, assessing whether a ring topology configured from the slave devices is able to be generated based on designed network configuration information created by a user and slave information representing unique information per type of each of the slave devices. The slave information includes port information of each of the slave devices, and each of the port information includes information of a ring start port and a ring end port supporting the ring topology. The ring topology assessment step assesses whether the ring topology is able to be generated based on the information of the ring start port and the ring end port included in the port information.

In addition, a management causing a computer to function as the management device, the management program being provided to cause the computer to function as the ring topology assessment unit, and a computer-readable recording medium storing the management program also fall within the technical scope of the invention.

Inventive Effects

According to the invention, a management device assisting in setting of a ring topology in a designed network configuration can be provided.

DESCRIPTION OF THE EMBODIMENTS

Hereinafter, several embodiments of the invention will be described in detail with reference to the accompanying drawings. Although a management device in a network system compliant with the standard of Ethernet for Control Automation Technology (EtherCAT, registered trademark) is described in the following embodiment, the invention is not limited thereto. The invention is applicable to a network system including one or more nodes.

Overall System Configuration

Figure 1:
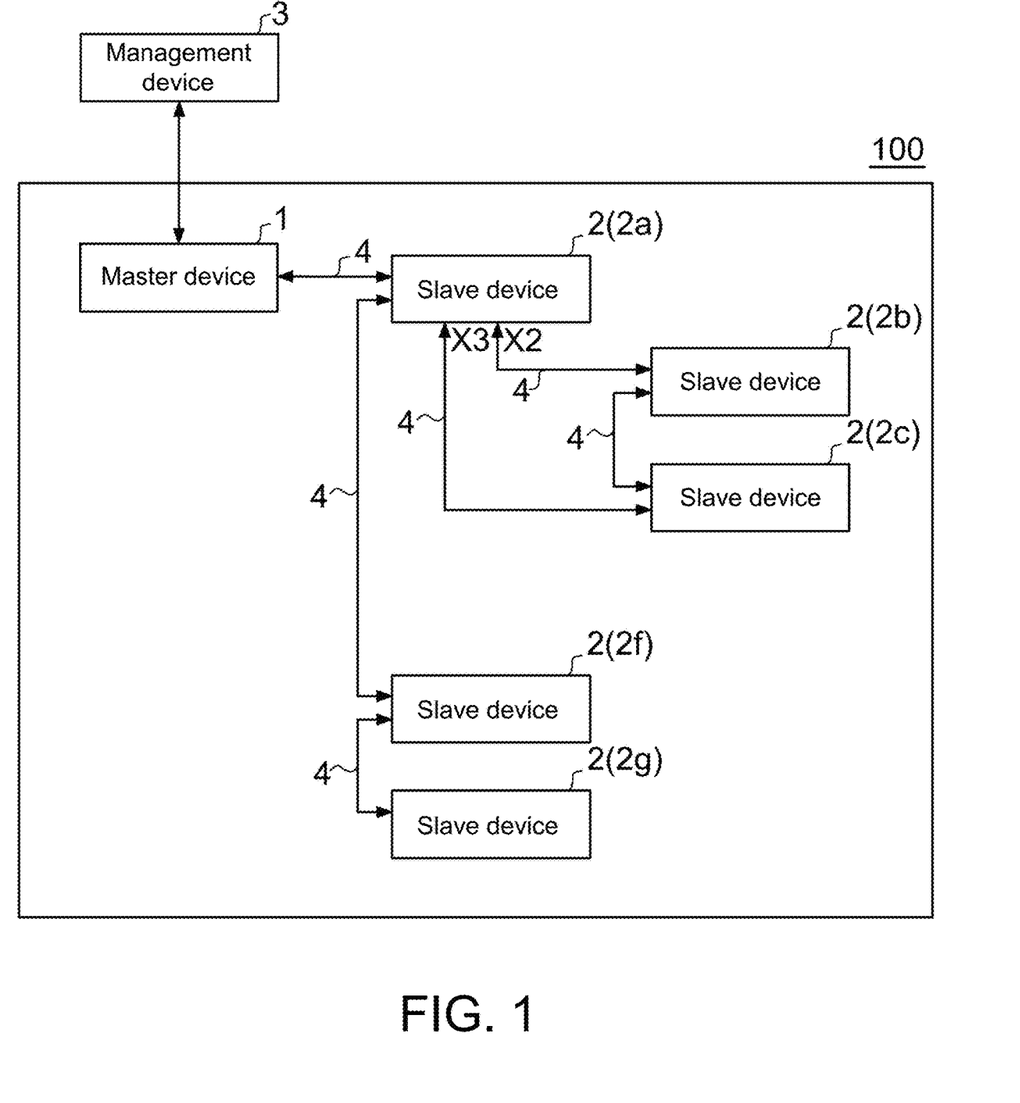
FIG. 1 is a block diagram illustrating a schematic configuration of an industrial network system 100 according to an embodiment of the invention.

FIG. 1 is a block diagram illustrating a schematic configuration of an industrial network system 100 according to an embodiment of the invention. The industrial network system 100 includes a network including a master device 1 and slave devices 2 connected to the master device 1 and a management device 3 connected to the master device 1. The master device 1 and the slave device 2 are connected by a cable 4 suitable for EtherCAT communication, and the slave devices 2 are also connected to each other by the cables 4 suitable for EtherCAT communication. The master device 1 and the management device 3 are connected through Ethernet (registered trademark) communication or USB communication in a wired or wireless manner. In the embodiment exemplified herein, the case where the nodes connected to the master device 1 are all slave devices 2 is described.

The master device 1 is configured by a device collectively managing the slave devices 2, such as a programmable logic controller (PLC). The master device 1 controls the slave device 2 by transmitting control commands for performing sequence control to the slave devices 2, and monitors the states of the slave devices 2 by receiving various data from the slave devices 2.

The slave devices 2 are devices controlling and collecting data of manufacturing equipment and performing control operations on the manufacturing equipment in accordance with the control commands from the master device 1 and processes of rewriting and returning the received control commands. As the slave device 2, a slave terminal, an NX unit, a CJ unit, an IO-LInk device, a power unit, a motor unit, a counter unit, an image unit, a communication unit, an I/O unit, etc., are included. The slave device 2 is properly connected to the manufacturing equipment in a wired or wireless manner. As the manufacturing equipment, an input device such as a press button, a limit switch, and an output device such as a lamp are included.

The number of the slave devices 2 connectible to the master device 1 and the topology are not particularly limited. In the embodiment, at most 512 slave devices 2 are connectible to one master device 1, and, in accordance with the convenience of the cooperation and wiring among the slave devices 2, any topology, such as a ring-like topology, a tree-like topology, or a star-like topology is applicable. Also, in addition to the master device 1 and the slave devices 2, the nodes may further include a hub device.

Management Device

Figure 2:
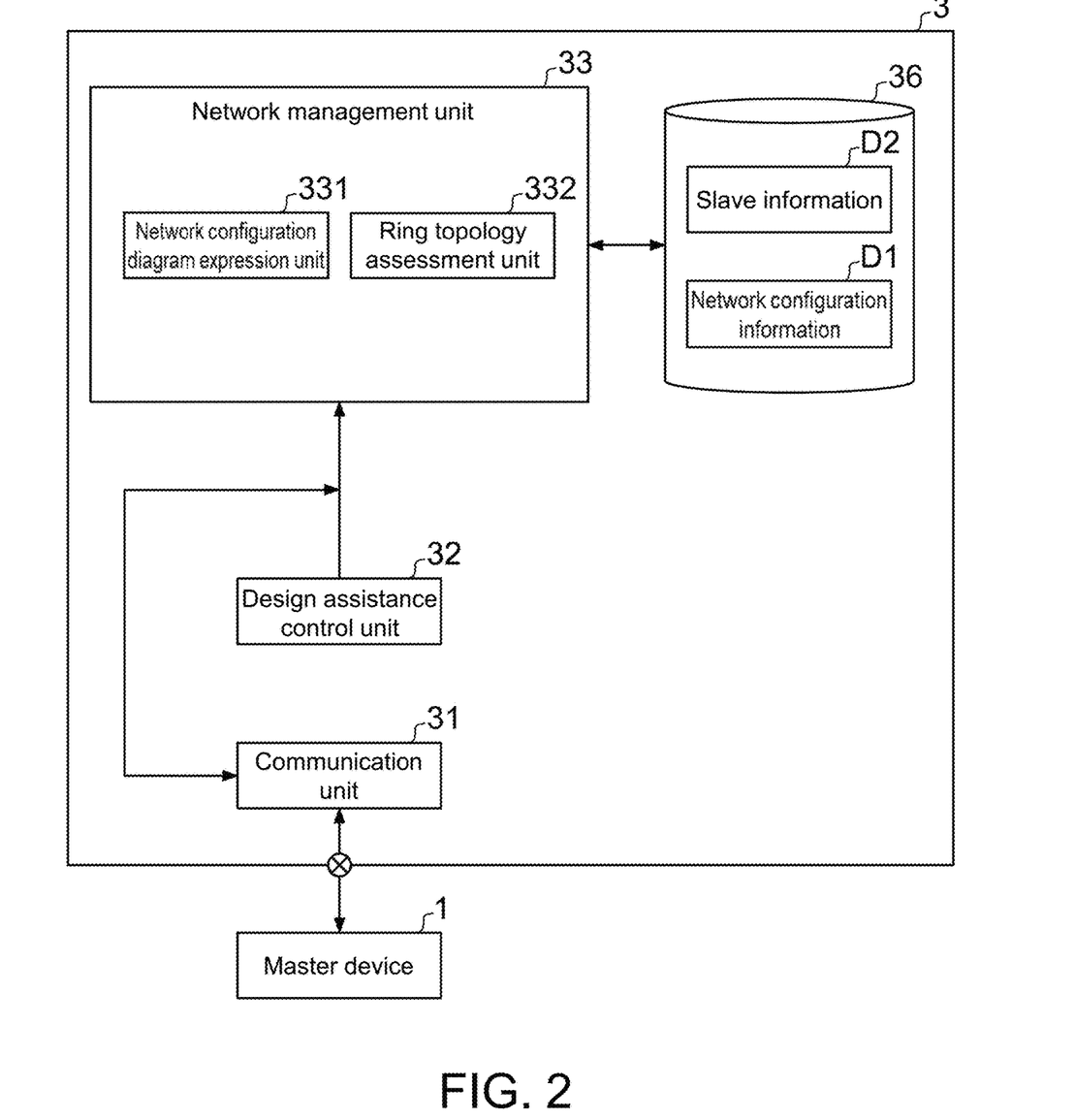
FIG. 2 is a block diagram illustrating a schematic configuration of a management device 3 according to an embodiment of the invention.

FIG. 2 is a block diagram illustrating a schematic configuration of the management device 3 according to an embodiment of the invention. The management device 3 is a computer managing the network of the master device 1 and the slave devices 2, and, for example, can be configured from a general-purpose personal computer. As the hardware configuration, the management device 3 includes, for example, a central processing unit (CPU), a main storage device (memory), an auxiliary storage device (e.g., hard disk, SSD), a display device, and an input device (e.g., keyboard, mouse).

In addition, as functional blocks, the management device 3 includes a communication unit 31, a design assistance control unit 32, a network management unit 33, a network management storage unit (not shown) and an auxiliary storage unit 36. The communication unit 31, the design assistance control unit 32, and the network management unit 33 are realized by reading a management program (not shown) stored in the auxiliary storage device to the main storage device and executing the program by the CPU. The management program may be recorded in a non-temporary computer readable recording medium such as a CD-ROM, or the recording medium may also be read by the management device 3 to install the management program in the management device 3. Alternatively, the codes of the management program may also be downloaded to the management device 3 via a communication network such as the Internet.

The storage unit can be set in the main storage device. In addition, the auxiliary storage device 36 can be set in the auxiliary storage device.

The communication unit 31 is a communication unit with which the management device 3 communicates with the master device 1. For example, the communication unit 31 is provided with a function of switching the communication protocol in accordance with the master device 1, a function of regularly transmitting/receiving related data, such as event logs, etc., for regularly monitoring an anomaly occurring in a node, and a function of performing a transmitting/receiving process for acquiring the event logs from each node.

The design assistance control unit 32 is provided with a function for controlling the operation of the management device 3 between the network including the master device 1 and the slave devices 2 and the user using the management device 3.

The network management unit 33 has a function of assisting in the state management of the network by the user. In order to realize such function, the network management unit 33 includes a network configuration diagram expression unit 331 and a ring topology assessment unit 332.

In the embodiment, the auxiliary storage unit 36 of the management device 3 stores in advance a network configuration information D1, as a project file, describing the designed network configuration created by the user, and a slave information D2 describing the unique information per type of each of the slave devices 2 from which the industrial network system 100 is configured.

The network configuration information D1 describes the profile information of the respective slave devices 2 from which the network system 100 is configured, the slave connection information, the address information, etc. The profile information is the information for identifying the type of the slave device 2, and includes, for example, the product code (model), the vendor ID, the revision number, etc., of the slave device. The slave connection information is the information for understanding the connection configuration (topology) of the slave devices. For example, the slave connection information includes the information for specifying the devices and the ports of the connection destinations of the slave devices, the connection information between ports, the information relating to the state of the ring topology, etc. The address information is the information indicating the values of the node addresses assigned to the slave devices.

The slave information D2 is a file created in advance in the format such as the XML format, etc., by the vendor of each slave device 2. The slave information D2 includes profile information and port information. The profile information is the information for identifying the types of the slave devices 2, and includes, for example, the product codes (models), the vendor IDs, the revision numbers, and whether there is ring topology support, etc., of the slave devices. The port information is the information relating to the ports owned by the slave devices 2, and includes, for example, information such as the number of ports, the types of ports, the start port/end port supporting the ring topology, etc. Since the slave information D2 is the file created by the vendor of each slave device 2, the information on whether there is support for ring topology, and the start port/end port for supporting the ring topology is the unique information of each slave device (i.e., the specification of each slave device).

The network configuration diagram expression unit 331 is a functional block expressing the network configuration diagram showing the connection relationship of the nodes. The network configuration diagram expression unit 331 refers to the network configuration information D1 stored in the auxiliary storage unit 36 and graphically expresses a network configuration diagram 41 shown in FIGS. 4 to 9. In the network configuration diagram 41, the nodes included in the network are indicated as icons and are expressed as a tree by connection lines 51 and 52. In addition, in the vicinity of each icon, the node address and the type name of the node are expressed. It should be noted that the specific expression mode of the network configuration diagram 41 is not limited thereto, as long as the user can intuitively understand the network configuration.

The ring topology assessment unit 332 is a functional block having a function of assessing whether a ring topology configured from the slave devices 2 can be generated for the industrial network system represented by the network configuration information D1 and a function for assessing whether the ring topology is supported for each slave device from which the ring topology is configured. The ring topology assessment unit 332 assesses whether the ring topology configured from the slave devices 2 can be generated based on the designed network configuration information D1 created by the user and the slave information D2 representing the unique information per type of each of the slave devices 2, performs an assessment on whether the ring topology is supported based on the slave information D2.

In the following, the function of the ring topology assessment unit 332 is described in detail. Firstly, terms relating to ring topology as used in the following descriptions are described with reference to FIG. 3. Then, with reference to FIGS. 4 to 8, the above functions provided in the ring topology assessment unit 332 are described in greater detail.

Descriptions of Terms Relating to Ring Topology

Figure 3:
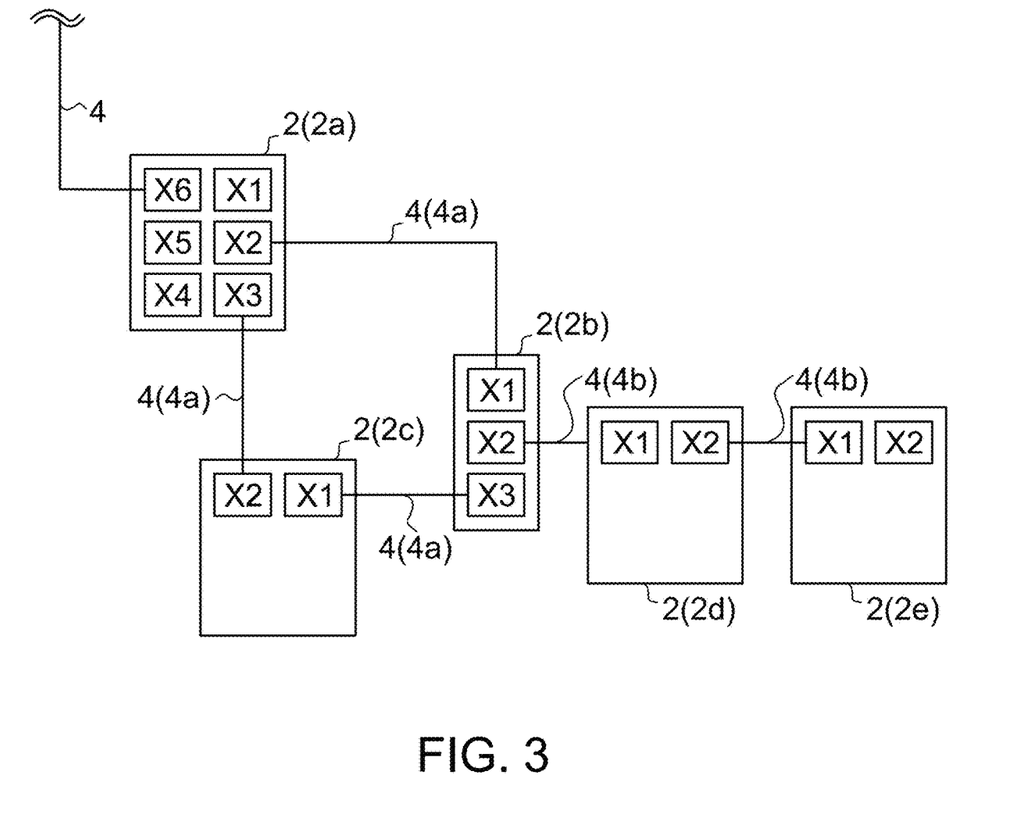
FIG. 3 is a schematic diagram for describing the names of slave devices and ports in a ring topology.

FIG. 3 is a schematic diagram for describing the names of the slave devices and the ports in the ring topology.

As an example, five slave devices 2 (2a to 2e) are shown in FIG. 3. In the example as shown, three slave devices 2a to 2c of the slave devices are connected in a ring shape. The mode in which the slave devices 2a to 2c are connected in a ring shape is referred to as a ring topology, and the cables 4 (4a) connecting the slave devices 2a to 2c in a ring shape are referred to as main lines of the ring topology. The remaining two slave devices 2d and 2e are connected in series from the slave device 2b from which the ring topology is configured. The cables 4 (4b) connecting the slave device 2b from which the ring topology is configured and the slave devices 2d and 2e are referred to as branch lines of the ring topology.

In the example as shown, the slave device 2a is referred to as the start slave of the ring topology, and the slave device 2c is referred to as the terminal slave of the ring topology. In addition, in the connection relationship among the ports as shown, a port X2 of the slave device 2a is referred to as the start port of the ring topology, and a port X3 of the slave device 2a is referred to as the end port of the ring topology. The terminal port of the slave device refers to the port whose topology circulation order is the last among the respective ports provided in the slave devices 2.

Setting of Ring Topology on Editor

FIGS. 4 to 8 are diagrams illustrating examples expressing a series of screens at the time of setting the ring topology on the editor.

Figure 4:
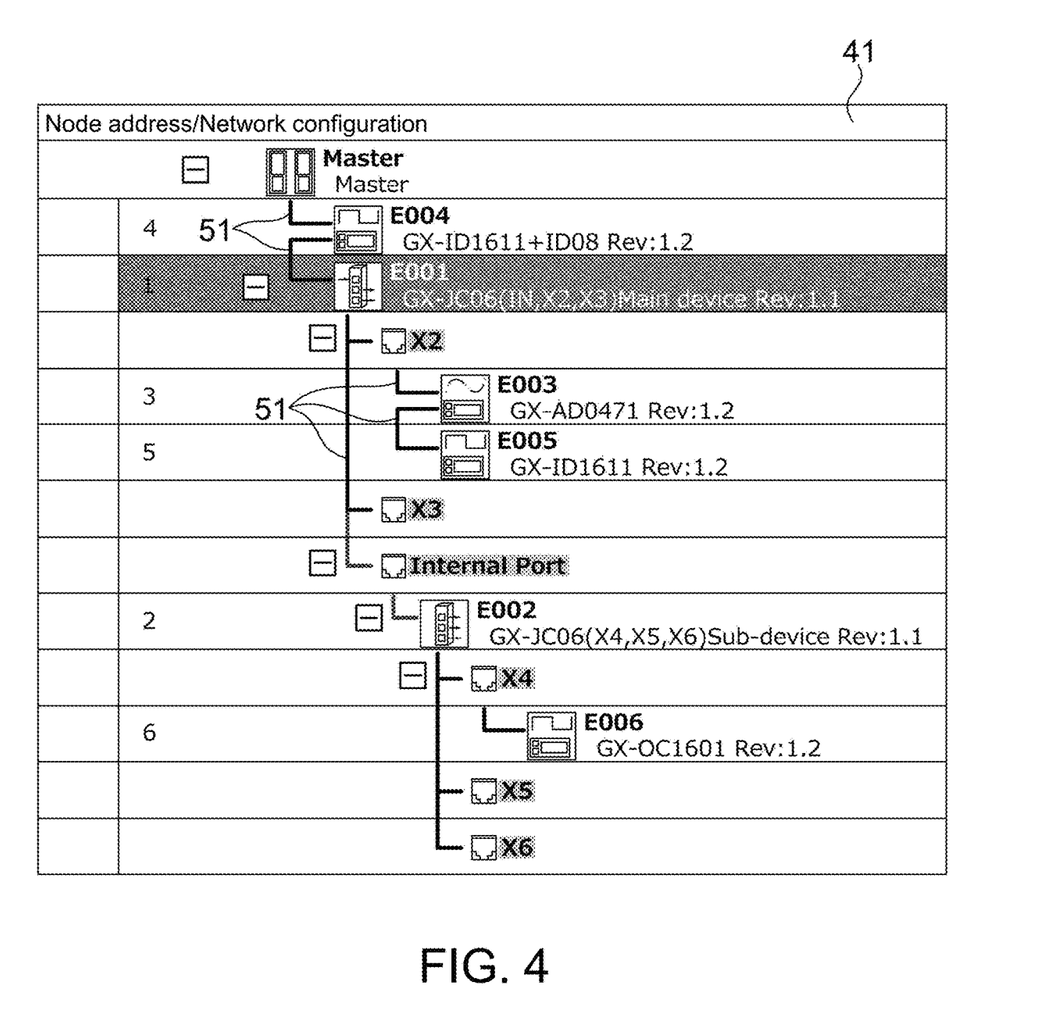
FIG. 4 is a diagram illustrating an example expressing a series of screens at the time of setting the ring topology on the editor.
Figure 5:
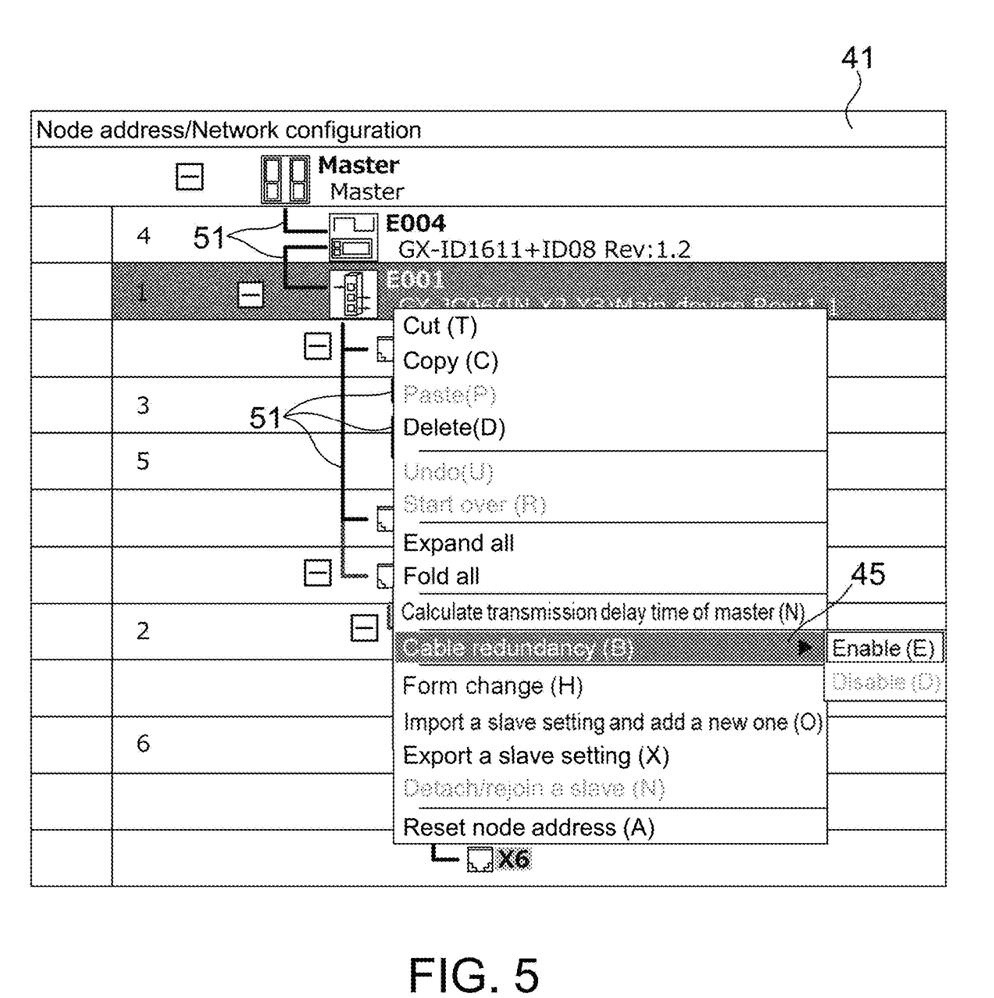
FIG. 5 is a diagram illustrating an example expressing a series of screens at the time of setting the ring topology on the editor.

Referring to FIGS. 4 and 5, in the network configuration diagram 41, the nodes included in the network are indicated by icons and are expressed as a tree by the connection lines 51. In the network configuration diagram 41, the user may select the slave device (node) to be set as the start of the ring topology, and notifies the ring topology assessment unit 332 that a ring topology is to be configured by using the selected slave device as the start through a context menu 45. In the example as shown, the node with a node address E001 is selected, and the ring topology assessment unit 332 assesses whether a ring topology can be generated by using the node with the node address E001 as the start.

Assessment on Whether Ring Topology can be Generated

The ring topology assessment unit 332 acquires profile information such as the product code (model), the vendor ID, the revision number, etc., of the selected slave device from the network configuration information D1.

Then, based on the profile information of the selected slave device, the ring topology assessment unit 332 acquires port information including information of start port/end port supporting the ring topology, which relates to the selected slave device, from the slave information D2. In the case where the information of the start port cannot be acquired, the ring topology assessment unit 332 assesses that the selected slave device cannot be set as the start of the ring topology, and express ineffectiveness in a context menu 45.

Then, the ring topology assessment unit 332 assesses whether the end port of the ring topology is an empty port based on the connection information among the ports in the slave connection information included in the network configuration information D1. In the example as shown, for the port X3 with the node address E001, whether the port X3 is an empty port is assessed. In the case where the end port of the ring topology is not an empty port, the ring topology assessment unit 332 expresses ineffectiveness in the context menu 45. Specifically, at the time of assessing whether the end port of the ring topology is an empty port, for the ports between the slave devices 2, the ring topology assessment unit 332 traces the connection relationship between the input port and the output port in the order from the input port to the output port by using the selected slave device as the start.

Figure 6:
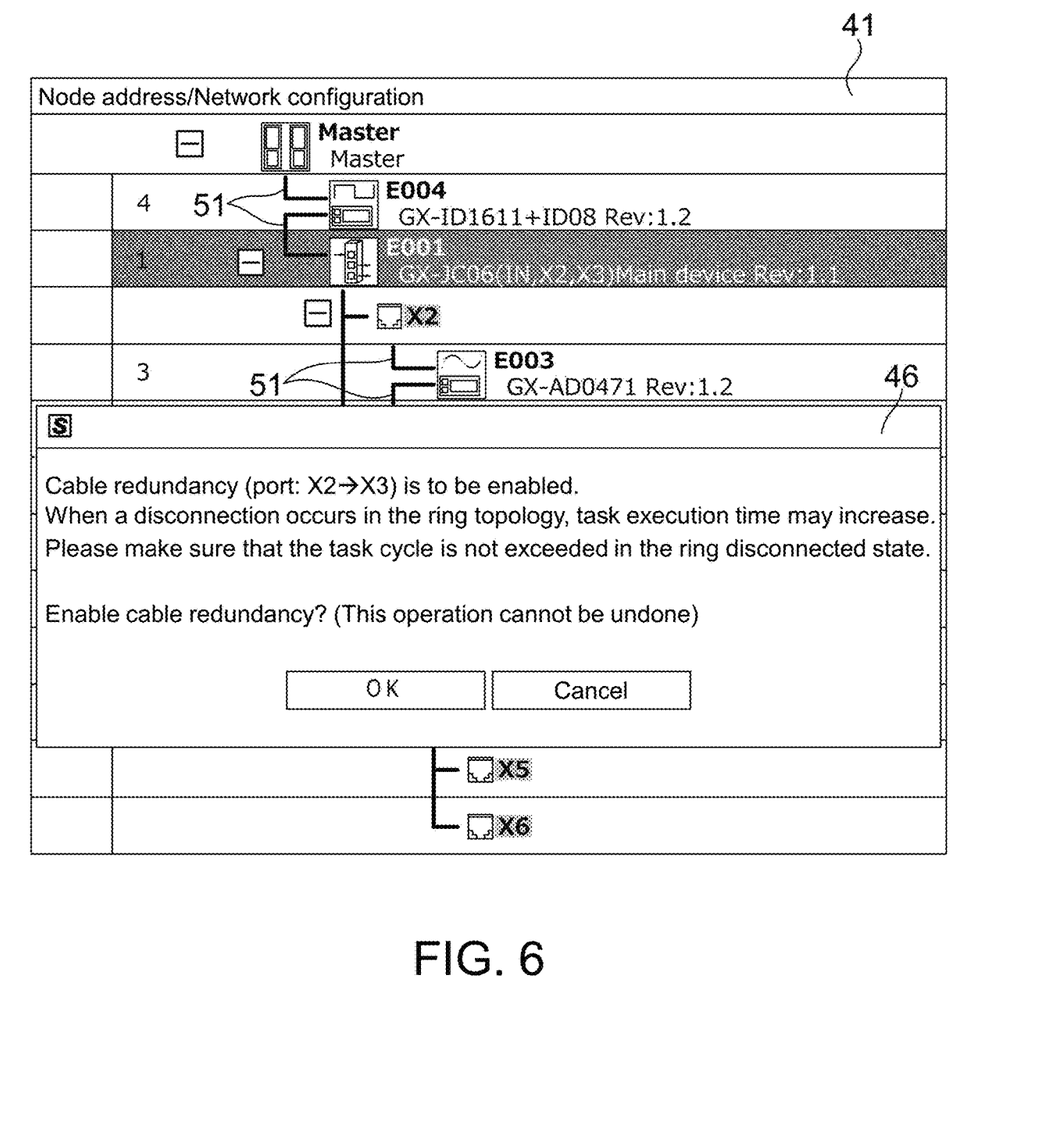
FIG. 6 is a diagram illustrating an example expressing a series of screens at the time of setting the ring topology on the editor.

Referring to FIG. 6, the ring topology assessment unit 332 uses the information of the start port/end port supporting the ring topology, which is acquired in relation to the selected slave device, and expresses a confirmation dialogue 46. The confirmation dialogue 46 expresses the information of start port/end port in which the cable redundancy by the ring topology is to be enabled and a confirmation message. In the example as shown, the port X2 with the node address E001 is set as the start port, and the port X3 is set as the end port.

Through the expression of the confirmation dialogue 46, the ring topology assessment unit 332 performs a confirmation with the user on enabling cable redundancy (whether the ring topology can be generated). In addition, with the port name of the branch slave being expressed in the confirmation dialogue 46, an erroneous setting by the user is prevented. In addition, by expressing the influence resulting from enabling cable redundancy as a confirmation message in the confirmation dialogue 46, the user is notified in advance of a possibility that an influence may be generated on the control program operating in the respective slave devices 2 from which the ring topology is configured.

With the user pressing the "OK" button in the confirmation dialogue 46, the user instructs the ring topology assessment unit 332 to enable the cable redundancy. The ring topology assessment unit 332 sets the selected slave device as the start, traces the connection relationship between the input port and the output port in the order from the input port to the output port, and configures the ring topology based on the start port/end port information. That is, the ring topology assessment unit 332 acquires the terminal port of the slave device connected below the start point through the network configuration information D1, and connects the terminal port of the slave device and the end port of the ring topology to configure the ring topology. After configuring the ring topology, the ring topology assessment unit 332 sets the value "effective" to the information relating to the state of the ring topology of the slave device (node) as the start of the ring topology in the network configuration information D1.

In the example shown in FIGS. 4 to 6, the ring topology assessment unit 332 configures the ring topology at the node with a node address E003 and a node with a node address E005 from the node with the address E001. In addition, the ring topology assessment unit 332 sets the value "effective" to the information relating to the state of the ring topology of the node with the address E001 in the network configuration information D1.

Figure 7:
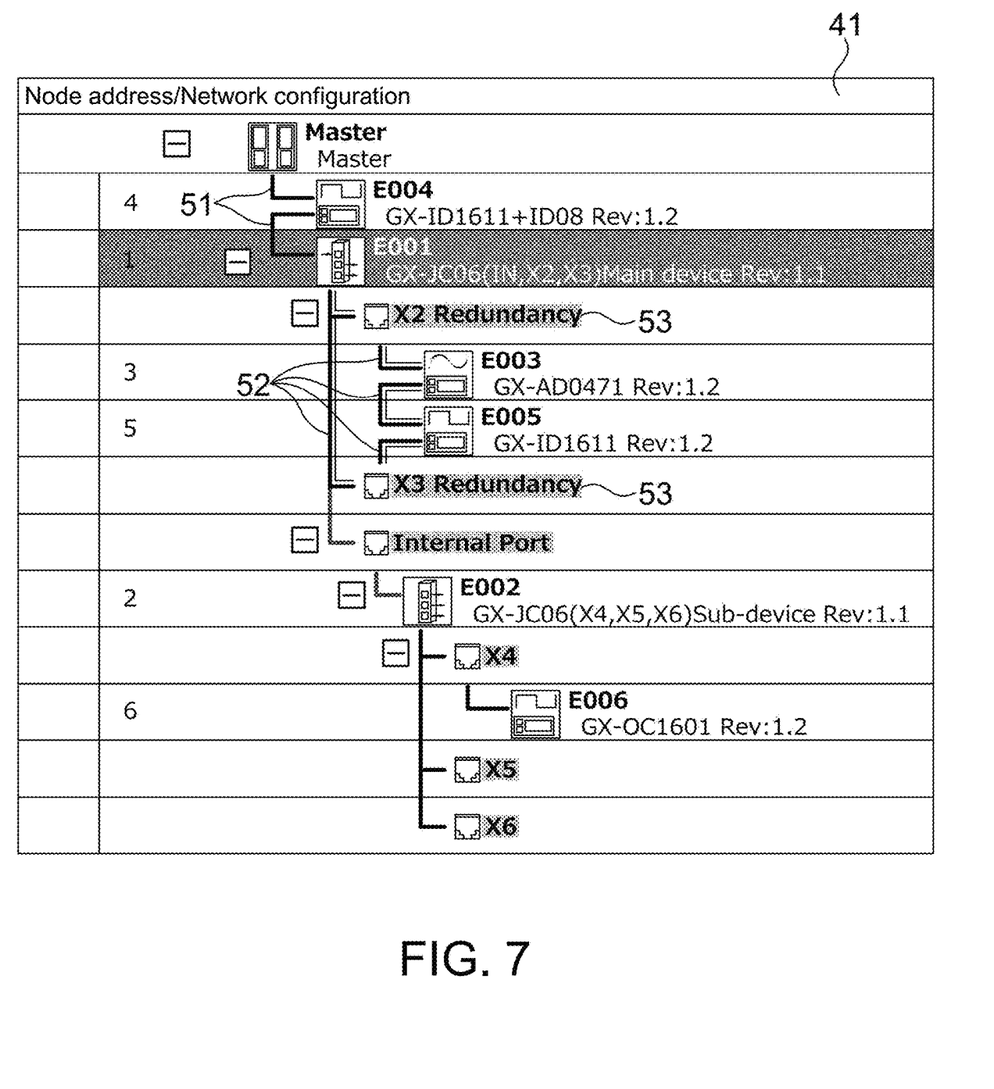
FIG. 7 is a diagram illustrating an example expressing a series of screens at the time of setting the ring topology on the editor.

Referring to FIG. 7, the ring topology assessment unit 332 identifiably expresses the positions of the nodes from which the ring topology is configured in the network configuration diagram 41.

In the example shown in FIG. 7, the ring topology assessment unit 332 indicates that the ring topology is configured from the node with the node address E003 and the node with the node address E005 from the node with the address E001 by using double lines 52 indicating the connection among the respective nodes in the tree expression in the network configuration diagram 41 for expression. The double line 52 is also used for expression between the output port of the node with the node address E005 and the output port X3 of the node address E001. In addition, in the example shown in FIG. 7, in order to illustrate the configuration of the ring topology, the ring topology assessment unit 332 expresses expressions 53 meaning that the ring topology is configured in the vicinities of the output ports X2 and X3 of the node with the node address E001. Accordingly, regarding the slave devices 2 on the editor, from which the ring topology is to be configured, the user can more easily understand the places where redundant wirings are set in the graphical expression in the designed network configuration diagram 41. Therefore, the operation for setting the ring topology in the designed network configuration is simplified.

It is noted that the mode for expressing the ring topology in the network configuration diagram 41 is not limited to the above mode. For example, a mode in which the icons and/or the connection lines are expressed with blinking or highlighting can be applied.

Assessment on Whether there is Support for Ring Topology

Figure 8:
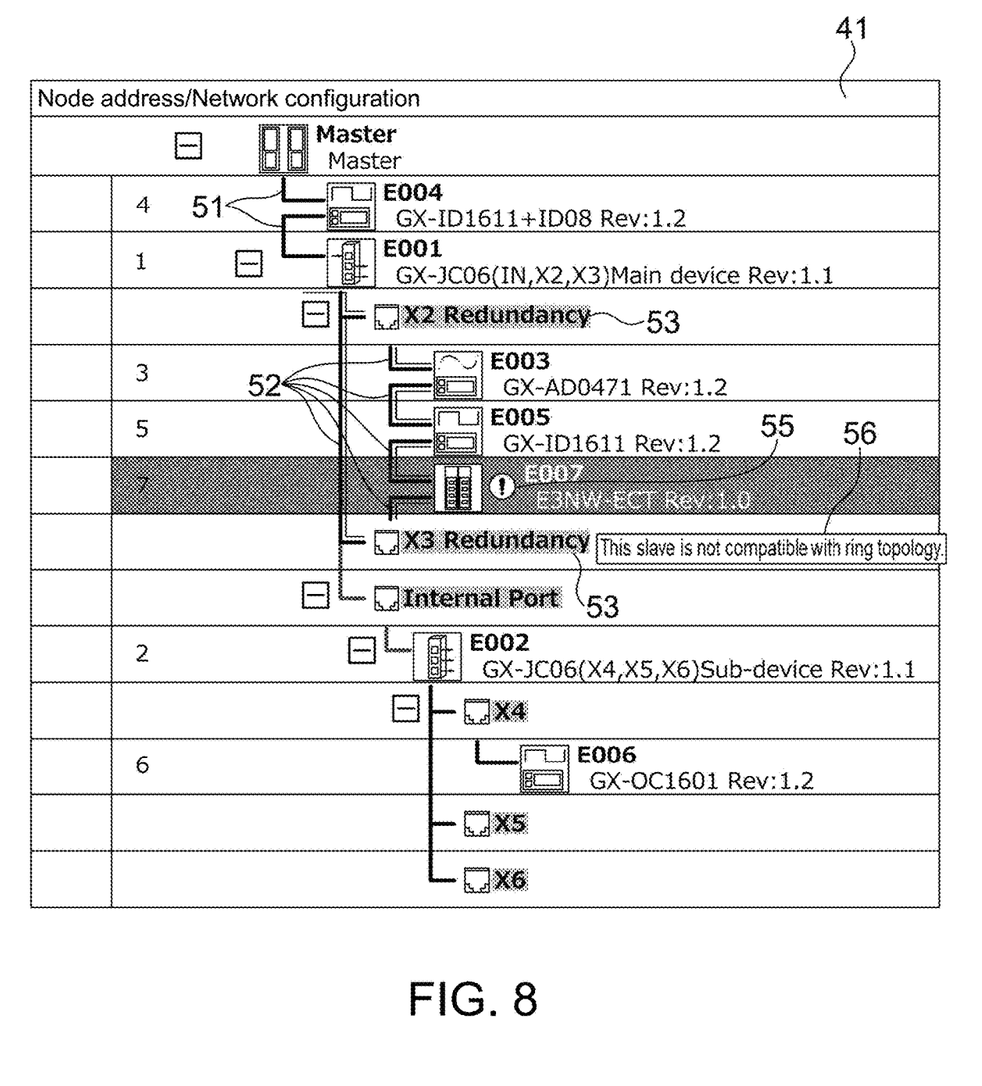
FIG. 8 is a diagram illustrating an example expressing a series of screens at the time of setting the ring topology on the editor.

Referring to FIG. 8, the ring topology assessment unit 332 assesses whether the ring topology is supported for each node from which the ring topology is configured on the editor.

Firstly, in order to specify the node where the assessment is performed, the ring topology assessment unit 332 acquires the profile information, such as the product code (model), the vendor ID, the revision number, etc., of each slave device from the start slave to the terminal slave of the ring topology from the network configuration information D1. Then, the ring topology assessment unit 332 assesses whether there is ring topology support based on the slave information D2 for each slave device from the start slave to the terminal slave of the ring topology in which the type is specified from the acquired profile information.

For example, the ring topology assessment unit 332 assesses whether the ring topology is supported based on whether there is ring topology support in the profile information included in the slave information D2. Alternatively, the ring topology assessment unit 332 assesses whether the ring topology is supported based on the information of the start port/end port supporting the ring topology of the port information included in the slave information D2.

In the case of assessing that the slave device 2 not supporting the ring topology is connected in the ring topology, the ring topology assessment unit 332 identifiably expresses the slave device 2 not supporting the ring topology in the network configuration diagram 41.

The example shown in FIG. 8 illustrates a case where the user erroneously or carelessly configure the ring topology by using a node with a node address E007 not supporting the ring topology due to the specification of the device. The user configures the ring topology in the node with the node address E003, the node with the node address E005, and the node with the node address E007 from the node with the node address E001. However, in the example shown in FIG. 8, an icon 55 is expressed in the vicinity of the node with the node address E007, and that the node with the node address E007 does not support the ring topology is identifiably expressed. In addition, in the example shown in FIG. 8, a message 56 indicating that a node not supporting the ring topology is connected in the ring topology is further expressed as a tool tip. In the mode shown in FIG. 8, an icon 55 is a warning icon. Accordingly, among the slave devices on the editor from which the ring topology is configured, the user can more easily notice the slave device not supporting the ring topology through the graphical expression in the designed network configuration diagram 41. Therefore, the operation for setting the ring topology in the designed network configuration is simplified.

It is noted that the mode for expressing the node not supporting the ring topology in the network configuration diagram 41 is not limited to the above mode. For example, a mode in which the icons and/or the connection lines are expressed with blinking or highlighting can be applied.

Canceling of Ring Topology in Editor

Figure 9:
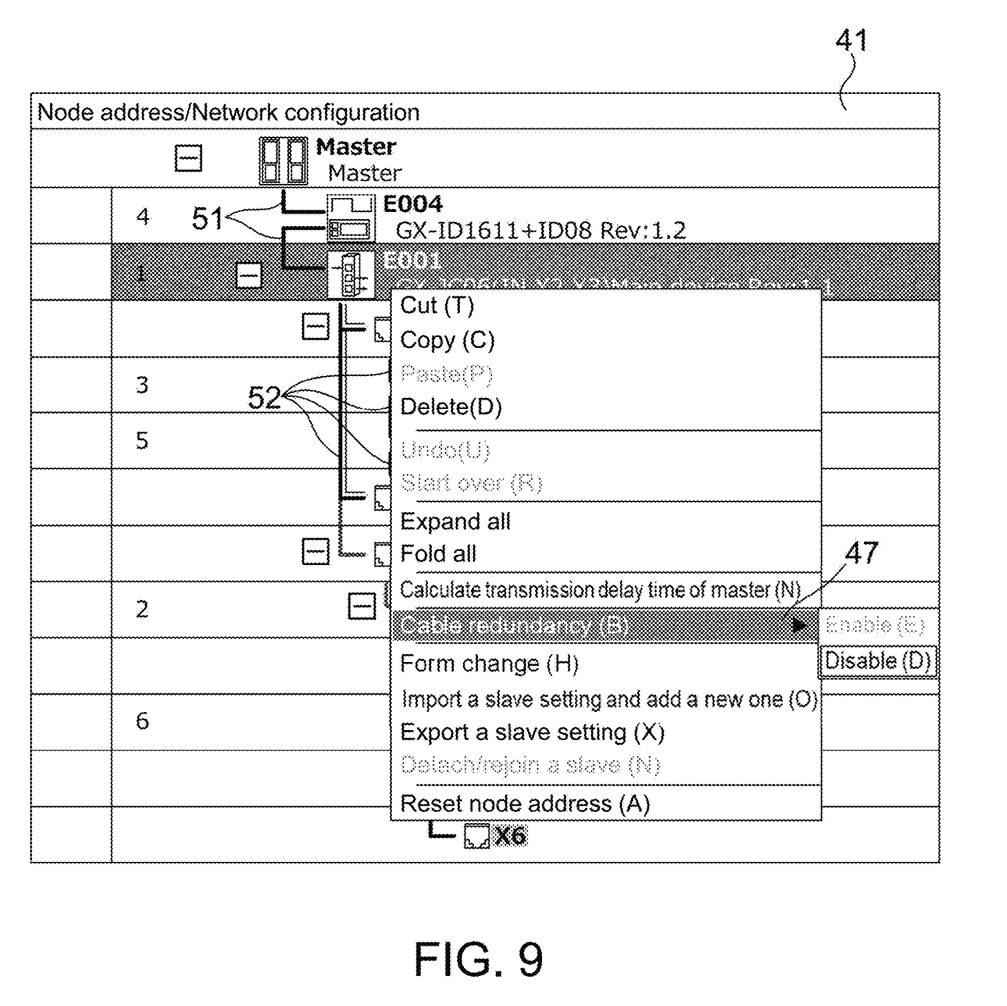
FIG. 9 is a diagram illustrating an example expressing a screen at the time of canceling the setting of the ring topology on the editor.

FIG. 9 is a diagram illustrating an example expressing a screen at the time of canceling the setting of the ring topology on the editor.

In the network configuration diagram 41, the user may select the slave device in which the setting of the ring topology is to be canceled, and notifies the ring topology assessment unit 332 that the ring topology configured by using the selected slave device as the start is to be canceled through a context menu 47. In the example as shown, the node with the node address E001 is selected, and the ring topology assessment unit 332 cancels the setting of the ring topology configured by using the node with the node address E001 as the start.

The ring topology assessment unit 332 uses the information of the start port/end port supporting the ring topology, which is acquired in relation to the selected slave device, and expresses a confirmation dialogue (not shown). The confirmation dialogue expresses the information of the start port/end port in which the cable redundancy by the ring topology is to be disabled and a confirmation message. With the user pressing the "OK" button in the confirmation dialogue, the user instructs the ring topology assessment unit 332 to disable the cable redundancy.

Then, the ring topology assessment unit 332 sets the value "ineffective" to the information relating to the state of the ring topology of the slave device as the start of the ring topology in the network configuration information D1. In addition, in the tree expression in the network configuration diagram 41, by using the connection line 51 meaning normal connection for expressing the double line 52 indicating the connection among the respective nodes from which the ring topology is configured, the ring topology assessment unit 332 identifiably expresses the cancellation of the setting of the ring topology in the network configuration diagram 41. In addition, in the case where the icon 55 or the message 56 indicating that a node not supporting the ring topology is connected in the ring topology is expressed, the ring topology assessment unit 332 cancels the expressions of the icon 55 and the message 56.

Management Method

Figure 10:
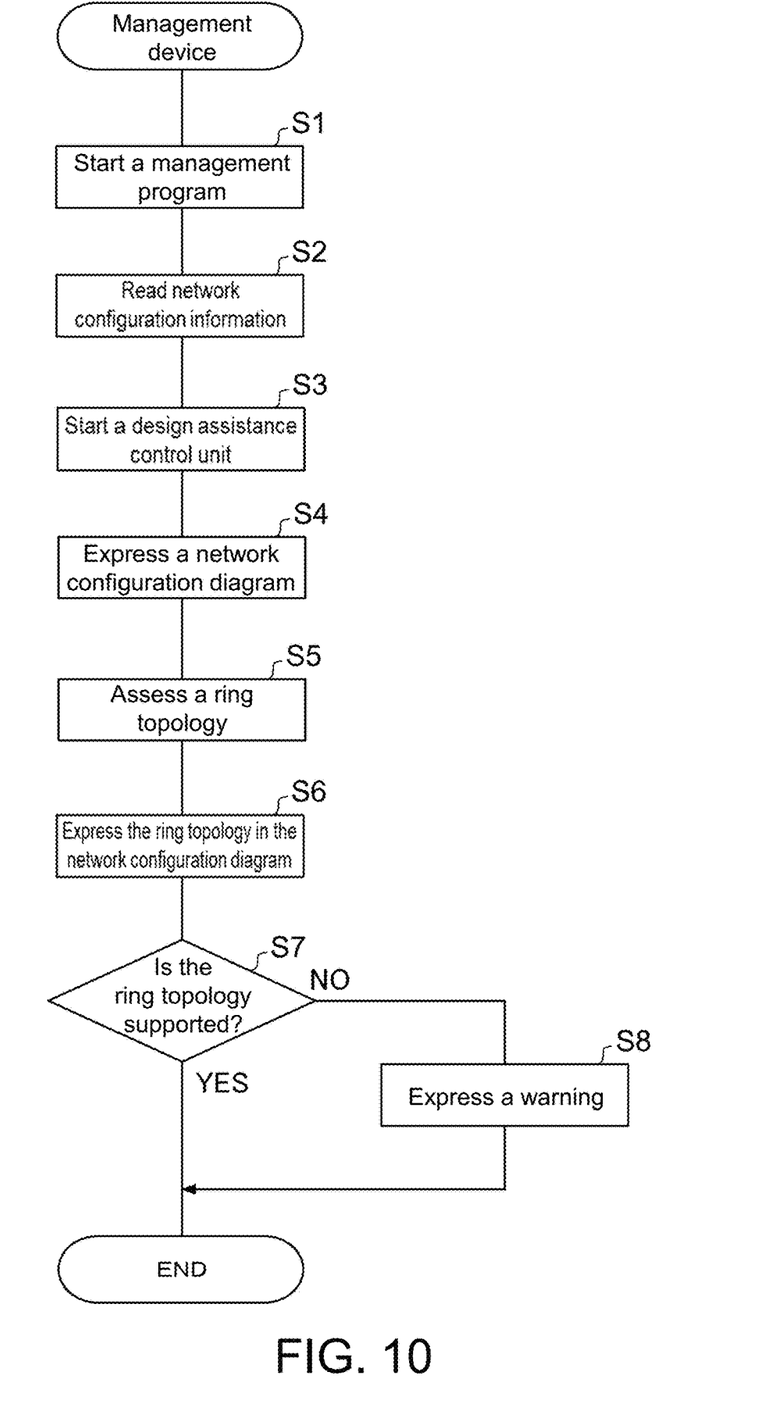
FIG. 10 is a flowchart illustrating a flow of processes in a management method according to an embodiment of the invention.

FIG. 10 is a flowchart illustrating a process flow in a management method for managing the network including the master device 1 and the slave device 2. The same figure shows the process procedure at the time of setting the ring topology on the editor in the management device 3.

First, when the user starts the management program in the management device 3 to open the project file (S1), the network management unit 33 is started, and the network configuration diagram expression unit 331 reads the network configuration information D1 stored in the auxiliary storage unit 36 to the storage unit (not shown) (S2). Then, when the user presses an editor start button (not shown) in the screen of the management program, in the management device 3, the design assistance control unit 32 is started (S3). Then, the network configuration diagram expression unit 331 expresses the network configuration diagram 41 based on the network configuration information D1 (S4).

In the network configuration diagram 41, when the user instructs the management device 3 to enable cable redundancy, the ring topology assessment unit 332 assesses whether a ring topology can be generated based on the network configuration information D1 and the slave information D2 (S5) and identifiably expresses the positions of the nodes from which the ring topology is configured on the editor in the network configuration diagram 41 (S6). Accordingly, regarding the slave devices 2 on the editor, from which the ring topology is to be configured, the user can more easily understand the places where redundant wirings are set in the graphical expression in the designed network configuration diagram 41. Therefore, the operation for setting the ring topology in the designed network configuration is simplified.

In addition, the ring topology assessment unit 332 performs an assessment relating to whether there is ring topology support based on the slave information D2, and assesses, for each of the nodes from which the ring topology is configured on the editor, whether the ring topology is supported (S7). The ring topology assessment unit 332 identifiably expresses the slave device 2 not supporting the ring topology in the designed network configuration diagram 41 (S8). Accordingly, among the slave devices on the editor from which the ring topology is configured, the user can more easily notice the slave device not supporting the ring topology through the graphical expression in the designed network configuration diagram 41. Therefore, the operation for setting the ring topology in the designed network configuration is simplified.

Other Modes

Although the embodiments of the invention have been described above, the invention is not limited to the above embodiments, and various modifications can be made without departing from the spirit of the invention. For example, a mode obtained by appropriately combining the technical means disclosed in the above embodiment also belongs to the technical scope of the invention.

In the above embodiment, the network configuration diagram 41 is expressed based on the network configuration information D1 stored in the auxiliary storage unit 36 of the management device 3. However, the invention is not limited thereto. For example, it may also be that the network configuration information stored in the master device 1 is acquired, and the network configuration diagram 41 is expressed based on the acquired network configuration information.

What is claimed is:

1. A management device, managing a network comprising a master device and a plurality of slave devices connected to the master device, the management device comprising:
a ring topology assessment unit, assessing whether a ring topology configured from the slave devices is able to be generated based on designed network configuration information created by a user and slave information representing unique information per type of each of the slave devices,
wherein the slave information comprises port information of each of the slave devices, and each of the port information comprises information of a ring start port and a ring end port supporting the ring topology, and
the ring topology assessment unit assesses whether the ring topology is able to be generated by tracing a connection relationship between an input port and an output port in an order from the input port to the output port based on the information of the ring start port and the ring end port comprised in the port information.

2. The management device as claimed in claim 1, wherein the ring topology assessment unit prompts the user with the information of the ring start port and the ring end port with which the ring topology is to be generated.

3. The management device as claimed in claim 2, wherein the ring topology assessment unit identifiably expresses a position of the ring topology in a network configuration diagram expressed based on the configuration information.

4. The management device as claimed in claim 2, wherein the ring topology assessment unit assesses, based on the slave information, whether the ring topology is supported for each of the slave devices from which the ring topology is configured.

5. The management device as claimed in claim 1, wherein the ring topology assessment unit identifiably expresses a position of the ring topology in a network configuration diagram expressed based on the configuration information.

6. The management device as claimed in claim 5, wherein the ring topology assessment unit assesses, based on the slave information, whether the ring topology is supported for each of the slave devices from which the ring topology is configured.

7. The management device as claimed in claim 1, wherein the ring topology assessment unit assesses, based on the slave information, whether the ring topology is supported for each of the slave devices from which the ring topology is configured.

8. The management device as claimed in claim 7, wherein the ring topology assessment unit identifiably expresses the slave device not supporting the ring topology in a network configuration diagram expressed based on the configuration information.

9. A management method, managing a network comprising a master device and a plurality of slave devices connected to the master device, the management method comprising:
a ring topology assessment step, assessing whether a ring topology configured from the slave devices is able to be generated based on designed network configuration information created by a user and slave information representing unique information per type of each of the slave devices,
wherein the slave information comprises port information of each of the slave devices, and each of the port information comprises information of a ring start port and a ring end port supporting the ring topology, and
in the ring topology assessment step, assessing whether the ring topology is able to be generated by tracing a connection relationship between an input port and an output port in an order from the input port to the output port based on the information of the ring start port and the ring end port comprised in the port information.

10. A non-transitory computer-readable recording medium, storing a management program causing a computer to function as: a management device that manages a network which comprises a master device and a plurality of slave devices connected to the master device and comprising a ring topology assessment unit,
wherein the ring topology assessment unit is configured by the management program to assess whether a ring topology configured from the slave devices is able to be generated based on designed network configuration information created by a user and slave information representing unique information per type of each of the slave devices,
wherein the slave information comprises port information of each of the slave devices, and each of the port information comprises information of a ring start port and a ring end port supporting the ring topology, and
the ring topology assessment unit is configured by the management program to assess whether the ring topology is able to be generated by tracing a connection relationship between an input port and an output port in an order from the input port to the output port based on the information of the ring start port and the ring end port comprised in the port information.

* * * * *